(12) United States Patent
Vineet

(10) Patent No.: US 11,423,255 B2
(45) Date of Patent: Aug. 23, 2022

(54) IMAGE PROCESSING

(71) Applicant: Five AI Limited, Bristol (GB)

(72) Inventor: Vibhav Vineet, Cambridge (GB)

(73) Assignee: Five AI Limited, Bristol (GB)

( * ) Notice: Subject to any disclaimer, the term of this patent is extended or adjusted under 35 U.S.C. 154(b) by 63 days.

(21) Appl. No.: 17/095,268

(22) Filed: Nov. 11, 2020

(65) Prior Publication Data

US 2021/0142107 A1 May 13, 2021

(30) Foreign Application Priority Data

| Nov. 11, 2019 | (GB) | ..................................... | 1916368 |
| Nov. 11, 2019 | (GB) | ..................................... | 1916378 |

(51) Int. Cl.
| G06K 9/62 | (2022.01) |
| G06K 9/00 | (2022.01) |
| G06N 3/08 | (2006.01) |
| G06V 20/40 | (2022.01) |
| G06V 20/10 | (2022.01) |

(52) U.S. Cl.
CPC ......... *G06K 9/6256* (2013.01); *G06K 9/6267* (2013.01); *G06N 3/082* (2013.01); *G06V 20/182* (2022.01); *G06V 20/46* (2022.01); *G06V 20/49* (2022.01)

(58) Field of Classification Search
CPC .... G06K 9/6256; G06K 9/6267; G06V 20/49; G06V 20/46; G06V 20/182; G06N 3/082
See application file for complete search history.

(56) References Cited

U.S. PATENT DOCUMENTS

| 2009/0028448 A1* | 1/2009 | Collomosse | ...... H03M 13/2717 |
| | | | 382/232 |
| 2020/0293064 A1* | 9/2020 | Wu | ...................... G06V 20/597 |

OTHER PUBLICATIONS

Lee et al, "Unsupervised Representation Learning by Sorting Sequences", 2017, Proceedings of the IEEE international conference on computer vision, pp. 667-676 (10 pages) (Year: 2017).*

(Continued)

*Primary Examiner* — David F Dunphy
(74) *Attorney, Agent, or Firm* — Andrew J. Tibbetts; Greenberg Traurig, LLP

(57) ABSTRACT

The present disclosure pertains generally to image feature extraction. Both transfer-learning and multi-task training approaches are considered. In one example, a machine learning model is trained to perform a geographic classification task of distinguishing between images captured in different geographic regions based on their visual content. In another example, a machine learning model is trained to perform an order recognition task of determining information about the order of an image sequence based on its visual content, where the order of the image sequence may be different than the order in which its constituent images were captured. A further example combines the two approaches. The knowledge gained by the ML model in learning one or more such tasks can be applied to a desired image recognition task, such as image segmentation, structure detection or image classification, e.g. with a pre-training/fine-tuning framework or a multi-task learning framework.

20 Claims, 13 Drawing Sheets

(56) References Cited

OTHER PUBLICATIONS

Misra et al., Shuffle and learn: unsupervised learning using temporal order verification. ArXiv preprint arXiv: 1603.08561v2. Jul. 26, 2016;2:1-21.
Geiger et al., Vision meets robotics: The kitti dataset. The International Journal of Robotics Research. Sep. 2013;32(11):1231-7.
Krizhevsky et al., Imagenet classification with deep convolutional neural networks. Advances in neural information processing systems. 2012;25:1097-105.
Sturgess et al., Combining appearance and structure from motion features for road scene understanding. BMVC-British Machine Vision Conference. Sep. 7, 2009:1-11.

* cited by examiner

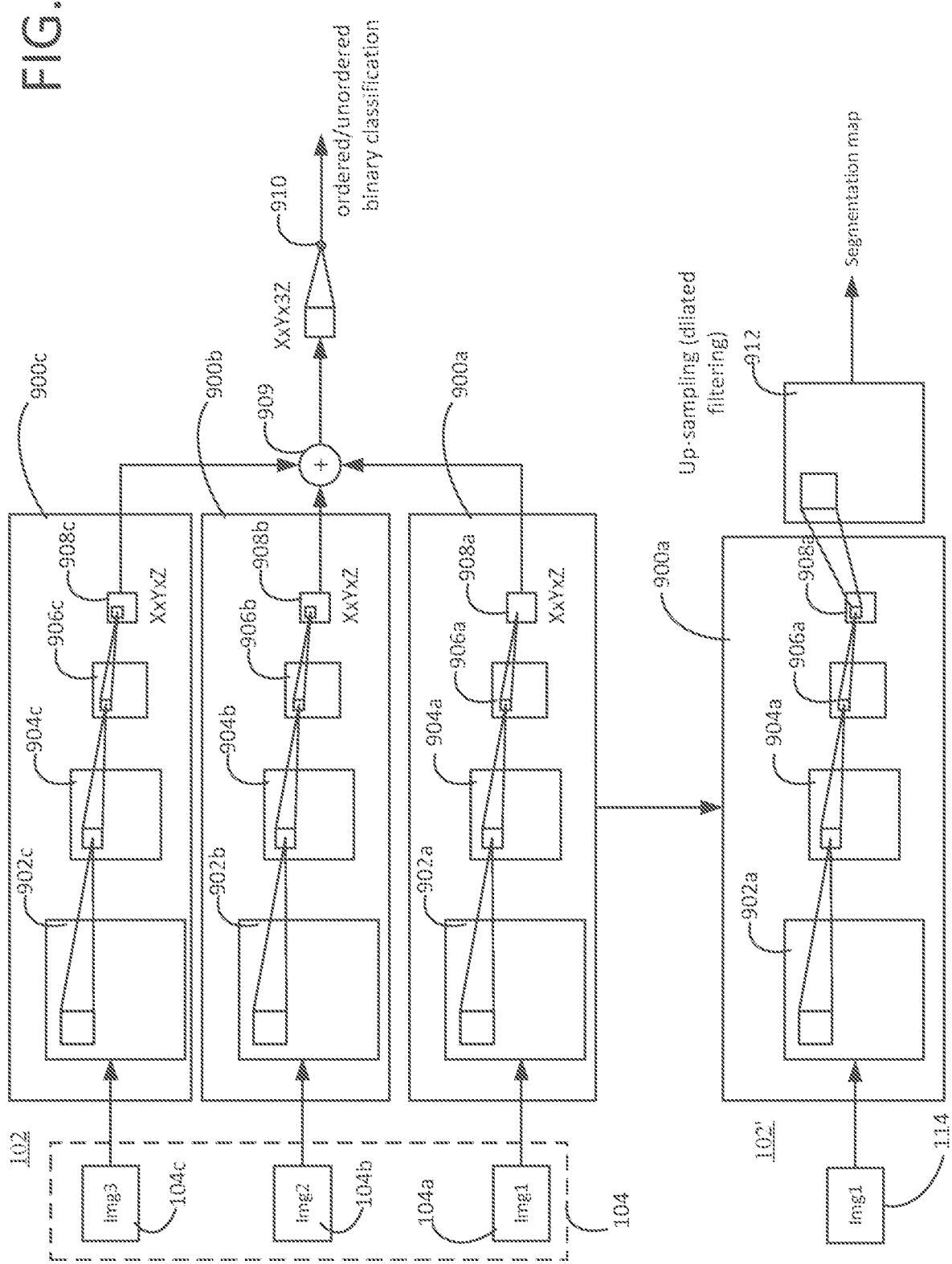

IMAGE PROCESSING

CROSS REFERENCE TO RELATED APPLICATIONS

This application claims the priority benefit under 35 U.S.C. § 119 of United Kingdom patent application number 1916368.2, filed Nov. 11, 2019 and of United Kingdom patent application number 1916378.1, filed Nov. 11, 2019. The entire contents of each of these applications are incorporated herein by reference.

TECHNICAL FIELD

This disclosure relates to image processing using machine learning (ML) models.

BACKGROUND

A ML model means a computer program or set of computer programs that has or have learned to perform a desired task from a set of training data, rather than being explicitly programed to perform that task. Typically an ML model has a set of cooperating model parameters (such as weights) in a defined model architecture, and is configured to process each received input according to those model parameters in order to determine a corresponding output. During training, the model parameters are tuned systematically based on the training data until the model is able to perform the desired task with sufficient accuracy. A successful ML model is able, once trained, to generalize its learning to inputs it has not encountered during training.

In supervised ML, a model is trained using labelled (annotated) training inputs. In a typical training phase, the model parameters are systematically tuned with the objective of optimizing a cost function (or objective function) that provides a measure of difference between "ground truth" labels assigned to the training inputs and the corresponding outputs of the model as determined by processing the training inputs according to the model parameters (the cost or error). A commonly used training process is stochastic gradient descent (SGD), which is an iterative process for optimizing a cost function that is differentiable with respect to the model parameters. With convolutional neural networks (CNNs) and other neural networks, SDC is often used in conjunction with a backpropagation algorithm to calculate the required gradients with respect to the weights in the network.

ML models have proved highly effective at performing various image processing tasks. Such tasks include semantic image classification (classifying an image in relation to a set of semantic classes according to its visual content), semantic image segmentation (per-pixel semantic classification) and structure detection (detecting objects and other structure in images, e.g. by predicting bounding boxes or other bounding structures). Convolutional neural networks (CNNs) are one example of a class of ML models which have proved highly effective in this context, and recent progress in computer vision has been fuelled by high-capacity CNNs trained on large datasets.

Such image processing tasks have many practical applications, including as autonomous driving, manipulation, activity forecasting and robotics.

An important development in computer vision was the discovery that deep CNNs could be used to extract higher and higher level representations of image content, through the application of successive convolutions over multidimensional dimensional feature spaces. This lead to breakthrough developments in image classification technology. Two examples of state of the art CNN architectures for image classification are AlexNet and VGGNet.

Whilst CNNs are able to achieve exceptional accuracy, very large sets of training data may be required to achieve this.

In the context of semantic image classification, it is comparatively straightforward to generate the vast sets of labelled training images that are required to achieve state of the art accuracy on image recognition, as each image need only be assigned a particular semantic class label according to its visual content.

However, a problem that arises in the context of more complex image recognition tasks such as image segmentation is the need for more complex training labels: in contract to image recognition (which only requires image-level ground truth labels), segmentation requires pixel-level ground truth labels. Similarly, object recognition requires labelling at the object level (typically by annotating training images with bounding boxes), which is also more burdensome.

The breakthrough developments in image classification have driven subsequent developments in so-called "transfer learning". Transfer learning (or, equivalently, "fine tuning") refers to methods of adapting an ML model, which has been trained to perform a particular task, to perform a different task whilst leveraging the knowledge it gained during its original training. As a consequence of the pivotal developments in semantic image classification, in the field of computer vision, much of the focus has been on exploring ways in which the knowledge gained by state of the art semantic image classification CNNs can be transferred to more complex image recognition tasks such as semantic segmentation. State of the art image segmentation results have been achieved by fine tuning state of the art image classification CNNs based on a comparatively small amount of segmentation training data (i.e. significantly fewer training images labelled at the pixel-level than would be required to achieve comparable accuracy if training the CNN to perform segmentation from scratch).

SUMMARY

The state of the art approach outlined above has led to something of a de facto two-stage process for learning complex image processing tasks: first, a CNN is trained to perform a simple, generic semantic image classification task using a very large set of generic training images that have been manually labelled at the image level in relation to a set of semantic classes (the "pre-training phase"); then the pre-trained CNN is fine-tuned using a relatively small, bespoke training set that is labelled as required for learning the more complex image processing task (the "transfer learning" or, equivalently, "fine-tuning" phase). In practice, this may involve taking a publically available, pre-trained semantic classification CNN and fine-tuning it as desired.

Whist this has proved effective, there are nonetheless significant drawbacks to this approach. Firstly, the pre-training training procedure is not scalable as even simple human semantic annotation required time and resources. Further, such human annotation introduces bias into labelled dataset which may adversely affect the learning capabilities of the CNN model: the method is ultimately reliant on humans accurately classifying a very large number training images according to their visual content in relation to a set of semantic classes, which in practice will always involve some degree of subjective human judgement, and hence will always be a potential source of error and/or bias.

The present disclosure pertains generally to image feature extraction. Both transfer-learning and multi-task training approaches are considered. In one example, a machine learning model is trained to perform a geographic classification task of distinguishing between images captured in different geographic regions based on their visual content. In another example, a machine learning model is trained to perform an order recognition task of determining information about the order of an image sequence based on its visual content, where the order of the image sequence may be different than the order in which its constituent images were captured. A further example combines the two approaches. The knowledge gained by the ML model in learning one or more such tasks can be applied to a desired image recognition task, such as image segmentation, structure detection or image classification, e.g. with a pre-training/fine-tuning framework or a multi-task learning framework.

Example embodiments may be implemented via "self-supervised" learning, i.e. machine learning with some self-supervised training signal. For example, self-supervision can be achieved by automatically defining a form of ground truth for image inputs, on which a cost function or loss function can be defined for optimization during training. This can, for example, be part of a "pre-training" phase, with the model subsequently fine tuned, or in a "multi-task" approach that removes or reduces reliance on human annotations—addressing the issue of scalability as well as human bias.

BRIEF DESCRIPTION OF FIGURES

For a better understanding of the present invention, and to show how embodiments of the same may be carried into effect, reference is made by way of example to the following figures in which:

FIG. 9 shows an example of a simplified convolutional neural network architecture that is subject to pre-training on an order recognition task and transfer learning.

DETAILED DESCRIPTION

Figure 1:
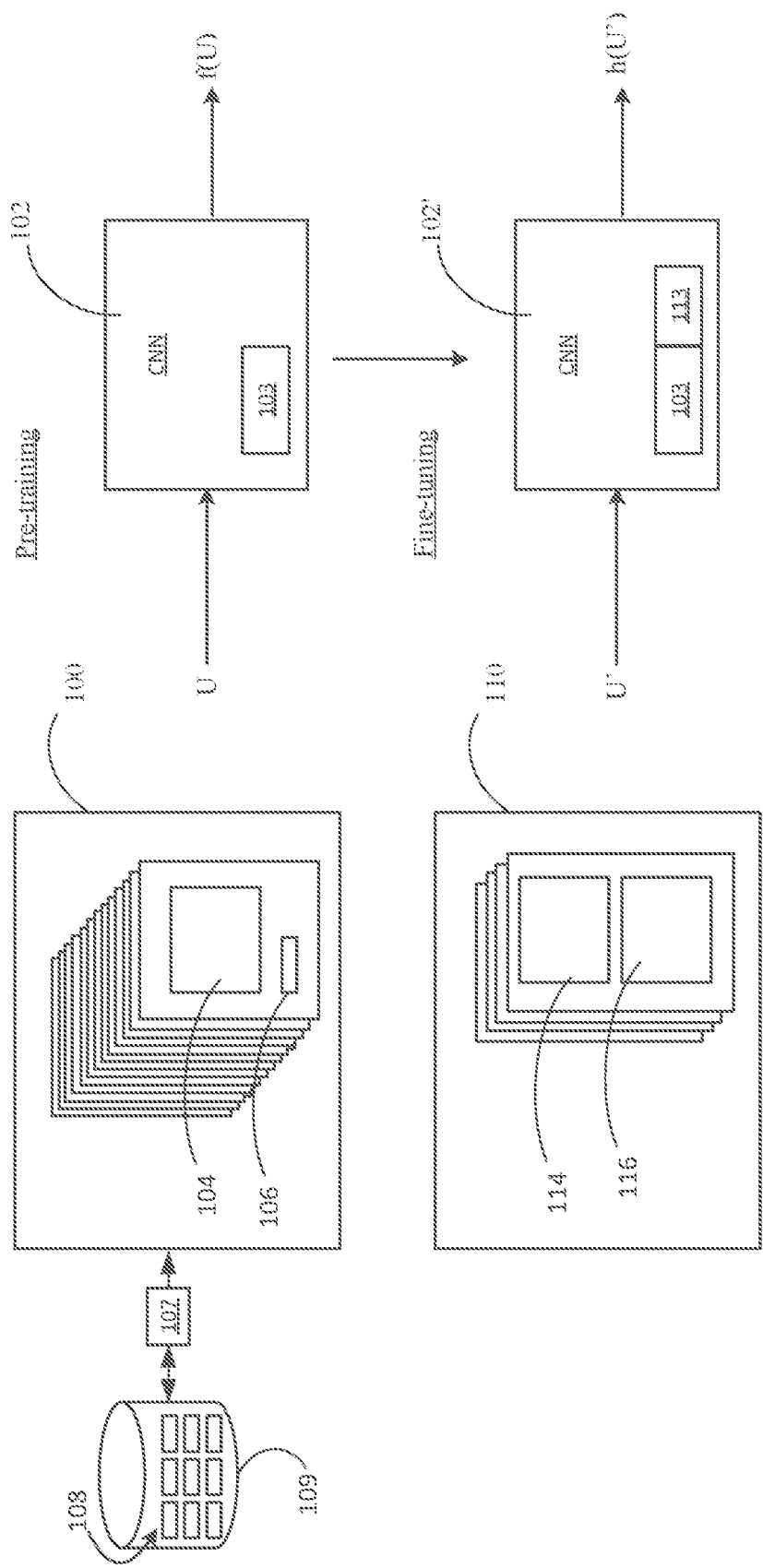
FIG. 1 shows a highly schematic block diagram of a convolutional neural network that is subject to pre-training and fine-tuning.

As noted, recent progress in computer vision has been fuelled by high-capacity convolution neural network trained on large datasets. One approach to training such high capacity models involves two stages: a pre-training stage where the CNN model is trained on a simpler image semantic classification task (i.e. the model learns to classify images as a whole based on their content), and a fine-tuning (transfer learning) stage in which the pre-trained model is fine-tuned for other tasks such as semantic segmentation (i.e. the model learns to classify pixels individually within images).

The two stage process is useful as there are large human annotated datasets available for image classification tasks. However this training procedure is not scalable as even simple human annotation is time consuming and expensive and so limits the scalability. Further, human annotation introduces bias into labelled dataset which may adversely affect the learning capabilities of the CNN model.

In some embodiments, an ML model is trained to accurately perform a desired and potentially complex image processing task using transfer learning, whilst removing this subjective element from pre-training. Rather than pre-training the model on a semantic image classification task (which has an inherently subjective element), instead it is pre-trained on an objective classification task. The model can then be fine-tuned on a desired image processing task.

In other embodiments, similar benefits are achieved but in a multi-task approach, in which a model is trained on an objective classification task (or tasks) and a desired image processing task simultaneously.

One such objective classification task considered herein is that of classifying images based on their visual content according to geographic regions (e.g. cities) in which they were captured. Thus the assigning of pre-training labels becomes an entirely objective exercise. This exploits the fact that different geographic regions exhibit unique visual characteristics that the model can learn to distinguish between. This in itself may or may not be an especially useful task in a given context, but in any event the knowledge gained in learning that task can be applied to a useful image processing task (such as semantic segmentation, object recognition or semantic image recognition/classification) using transfer learning or multi-task training.

This also means that the pre-training labels can be assigned automatically, based on geographic data associated with the images, which in turn makes the process scalable.

Another such objective task considered herein is that of classifying sequences of video frames (frame images), each having a determined order, based on their visual content in relation to image order classes. That is, the ML model learns to distinguish image sequences based on the respective ordering of the images therein (one example of an "order recognition" task as that term is used herein). Thus the assigning of pre-training labels becomes an entirely objective exercise that depends on the chosen ordering of the images in the pre-training image sequences. This in itself may or may not be an especially useful task in a given context, but in any event the knowledge gained in learning that task can be applied to a useful image processing task (such as semantic segmentation, object recognition or semantic image recognition/classification) using transfer learning or multi-task training.

In the described embodiments, an order recognition task is implemented as a simple binary classification task, with "ordered" and "unordered" image order classes. Each pre-training image sequence contains at least three frame images which can be either ordered (in the same order) or unordered (in a different order) relative to the video image from which they are extracted. However, the techniques can be applied more generally to other order recognition tasks as applied to sequences of images each having a determined order.

In embodiments, each training image sequence may comprise at least three extracted frame images, wherein some of the training image sequences are ordered and the rest are unordered, wherein the training label assigned to each pre-training image sequence indicates whether the pre-training sequence are ordered or unordered (relative to the video image from which the images thereof have been selected), and the ML model is trained to distinguish between ordered and unordered image sequences.

As noted, such image processing tasks have many useful applications. One example is autonomous driving, in which an autonomous vehicle (AV) is equipped with image capture devices and makes autonomous driving decisions based on the results of ML image interpretation that it applies to the images it captures. The image processing can be used for example to detect road structure and other environmental structure, pedestrians, other vehicles etc., which in turn allows the AV to make decisions safely taking into account its surroundings. Convolutional neural networks (CNNs) are one example of a class of ML models which have proved highly effective in this context.

The images may comprise road images, e.g. as captured using an image capture device of a travelling vehicle (e.g. a dash cam or similar). For example, the images may comprise street scene images as captured by a vehicle(s) driving in different cities. Such images are likely to capture a wide range of unique visual characteristics of different geographic regions (e.g. cities) that the model can then learn to distinguish between.

Such embodiments have particular applicability to autonomous driving, because the pre-training is being performed on the type of image that an AV will actually encounter in use, i.e. outdoor road images of the kind that will be captured by the AV and will serve as a basis for its autonomous decision making.

Another problem with the existing approaches to learning complex image recognition tasks is that, due to the need for large pre-training data sets, a necessary compromise may be that the pre-training is performed based on a generic image dataset that is not specific to the ultimately desired image processing task. For example, when training a CNN (or other model) to perform segmentation on outdoor road images using the conventional two-stage approach outlined above, a necessary compromise may be that the pre-training is performed on a generic image dataset (e.g. containing images of cats, dogs, humans, furniture, buildings etc. that are labelled in relation to corresponding semantic classes) that has no particular relation to the type of images an AV will actually encounter in use or the specific type of visual structure that it needs to be able to interpret. This means that it is only in the fine-tuning phase that the CNN will actually encounter the kind of outdoor road images that the AV needs to be able to interpret accurately in use. However, with the present embodiments, it becomes possible to perform both the pre-training and the fine-tuning phases using outdoor road images of the kind that an AV will encounter in use, which in turn is expected to provide an improvement with respect to state of the art image interpretation technology in an autonomous driving context. Similar benefits can be achieved in a multi-task implementation.

The images may be frame images extracted from geographically-tagged video images. Beneficially, this allows very large numbers of training images to be collected and labelled efficiently for training on the city classification task.

Beneficially, the pre-training phase may utilize the vast amount of tagged image content that is available on the Internet today, such as dash cam video captured by vehicles driving though cities that is uploaded to content sharing platforms and tagged according to city, or images provided by online map and street viewing tools that are associated with the regions on a map on which they were captured. As another example, images could be captured with location-tracking (e.g. GPS) data that allows them to be tagged according to geographic location automatically.

City Classification

Example embodiments adopt an approach to learning generalizable visual representations without human semantic supervision. A learning problem for a convolution neural network is formulated objectively as one of classifying cities in which images were taken. In order to generate training set, a set of videos (video images) corresponding to different cities may for example be collected from an online video sharing platform on which videos are tagged according to city. This allows city labels to be automatically assigned to frames (frame images) extracted from the videos. The location name used to search for videos on the online video sharing platform can directly provide the class name for the training images. The can then be used to train the CNN to predict a city name given an image.

Having pre-trained the model on such city classification tasks, it can then be fine-tuned to a per-pixel semantic segmentation task or other desired image processing task. Surprisingly the knowledge gained though learning city-based image classification generalizes very well to generic semantic segmentation tasks and comes close in accuracy to a model trained on a much larger human annotated segmentation dataset.

The present techniques have particular applicability when applied with street scene images, as these are highly likely to capture many such visual characteristics that are unique to specific cities. Accordingly the techniques have particular applicability in the context of autonomous driving (and particularly urban driving), where autonomous driving decisions are made based on the results of image processing applied to street scene images, as both the pre-training and the fine-tuning can be performed on the type of images that an AV will actually encounter in use.

This approach has been used to successfully train a high-capacity convolution neural network model. The videos were mainly collected for country capitals and other high populated regions in a country (see Table 1, below).

Interestingly these cities have been found to exhibit unique and subtle differences due to man-made structures, differences in buildings, traffic-sign, traffic lights, road agents as cars, buses, trucks, markings on the road etc. The CNN uses this information to classify different cities and while doing that it also learns important characteristics about cars, pedestrians and other road users. As will be appreciated, this base learning is by its nature particularly useful in the context of autonomous driving.

However, the present disclosure is not limited in this respect and can be implemented on any pre-training image sets capturing visual characteristics that are unique to the geographic regions over which the model is trained.

The CNN pre-trained for the city classification task can then be transferred to semantic segmentation or other desired image interpretation tasks on urban road scene datasets, in the manner described below.

The fine-tuning phase is performed using training data that is specific to the desired image processing task. For example, for an image segmentation task, this would require a set of fine-tuning images that are labelled at the pixel-level; for object/structure recognition, this would require a set of fine-tuning images that are labelled at the applicable object/structure level. However, because this is leveraging the knowledge gained by the model in pre-training, significantly less training data is required in the transfer learning phase to achieve a desired level of accuracy on the desired image processing task. For instance, the inventor has been able to achieve acceptable accuracy on an image segmentation task with only a few hundred training images that are labelled at the pixel level, following pre-training on city names.

It will be appreciated that, although the following is described in relation to image segmentation, the present disclosure is not limited in this respect and can be extended to other desired image processing tasks.

FIG. 1 shows a highly schematic function block diagram of a ML model. At the hardware level, the ML model is embodied in a computer system as a computer program or a set of computer programs executed on execution hardware of the computer system. The execution hardware can for example comprise one or more processing units. A processing unit can for example be a CPU or accelerator (e.g. GPU). Alternatively or additionally, the execution hardware may comprise special-purpose hardware arranged to execute (part of) the model, such as an FPGA or ASIC.

The ML model is a CNN in this example. The top-half of FIG. 1 shows the CNN 102 in the pre-training phase, in which the CNN 102 is trained based on a large training set 100 of annotated street scene images (pre-training images). That is, street scene images having associated image annotation data. In FIG. 1, a street scene image is labelled 104 and its corresponding image annotation data is labelled 106. For pre-training on city classification, the annotation data 106 may simply denote the name of a city in which the image was captured.

The pre-training annotation data 106 is generated automatically, with no or minimal human input, by a training data collection algorithm 107 executed in the computer system. These are based on geographic data that is associated with the training images 104. For example, the training images 104 can be extracted by the algorithm 107 from geographically-tagged video images 108 that are obtained from one or more online video databases 109. Geographic search terms (e.g. city names) can be used to search the database(s) 109, and the city associated with a video image can be determined from the search term that was used to locate that video image. This in turn can be used to automatically label all frame images extracted from that video image.

For pre-training, the CNN has an initial set of model parameters 302 in an initial model architecture. The CNN 102 takes, as an input, image data of a pre-training street scene image, labelled U, and generates an output $V=f(U)$ where $f$ is a function defined by the set of initial model parameters 103 of the CNN 102. In a CNN, the model parameters comprise weights between neurons (nodes) of the CNN as is known in the art.

The CNN 102 is trained based on the pre-training images 104 so as to match its output $f(U)$ to the corresponding annotation data 106. For example, $f(U)$ may be a vector with each component corresponding to a particular city name. This is a recursive process, in which image data of the training images are systematically inputted to the CNN 102, and the initial model parameters 103 of the CNN 102 are systematically adapted in an attempt to optimize a cost function that provides a measure of difference between the output $f(U)$ and the corresponding annotation data 106 for each of the training images (the cost or error). The aim of training is to minimize the cost function to the extent it can be minimized without overfitting. The training can be based on a computation of the gradient of the objective function with respect to the model parameters, e.g. using SGD in combination with backpropagation.

Once the CNN 102 has been pre-trained in this manner to perform the task of classifying images according to the city in which they were captured, the pre-trained model 102 is fine-tuned to the semantic segmentation task (bottom of FIG. 1). Generally this involves adapting the initial architecture to incorporate additional parameters 113, and possibly removing some of the initial parameters 103 that were learned in pre-training.

The fine-tuned CNN is denoted 102'. As indicated, at least some of the initial parameters 103 as learned in pre-training are retained, but the additional model parameters 113 are introduced as part of the architecture modification. Some of the initial parameters 103 may be discarded, for example by "removing" one or more of the final layers of the CNN 102. The adapted CNN 102' processes an input U' according to a combination of the initial parameters 103 (to the extent they are retained) and the additional parameters 113, so as to compute a new function h(U').

In the fine-tuning phase, a smaller training set 110 is used (fine-tuning set). This also comprises street scene images 114 (fine-tuning images) with associated annotation data 116, however this time the annotation data 116 for each fine-tuning image 114 is in the form of a segmentation ground truth map that individually labels each pixel in that image 114 in relation to a set of semantic segmentation classes. For example, individual pixels could be labelled as one of road, vehicle, pedestrian etc. (and in general different pixels in the same image may be assigned different classes).

The same training methodologies are used to adapt the additional model parameters 113 so as to match h(U') to the corresponding ground truth segmentation map 116 (segmentation mask) for each fine-tuning image 114, i.e. by optimizing a cost function that provides a measure of difference between h(U') and the corresponding segmentation annotation data 116 for each fine-tuning image 114. In this case, h(U) may be a multi-dimensional array, each component of which corresponds to a particular pixel and a particular semantic segmentation class. The initial parameters 103, to the extent they are incorporated into the adapted CNN 102', may be frozen during fine-tuning (i.e. they may remain fixed at their values as determined in the pre-training phase, such that only the additional parameters 113 are modified).

Transfer learning/fine-tuning is known per se. As noted above, state of the art segmentation networks have been trained by fine-tuning a CNN that has been pre-trained on an image classification task. Two examples of well-known image classification CNNs that have been fine-tuned for segmentation are AlexNet and VGGNet. A typical approach is to replace one or more of the final layers of the CNN with new up sampling layer(s), which in turn are trained on a relatively small amount of segmentation data. The same techniques can be applied in the present context without any significant changes to the underlying architecture (i.e. using essentially the same architecture modifications that are currently used to transfer learning from semantic classification to semantic segmentation), but with the significant benefit that the pre-training is performed based on an objective classification task and can be performed without the need for any manual labelling.

A specific example is described below with reference to FIG. 4. First, some context to this example is provided.

As is well known in the art, a neural network is formed of a series of "layers", which in turn are formed of neurons (nodes). In a classical neural network, each node in an input layer receives a component of an input to the network (such as an image), which is typically multidimensional, and each node in each subsequent layer is connected to each node in the previous layer, and computes a function of a weighted sum of the outputs of the nodes to which it is connected.

Figure 2:
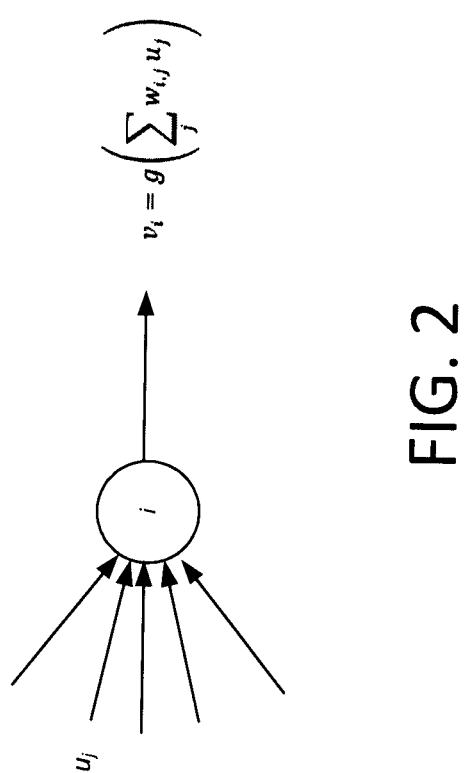
FIG. 2 shows a schematic block diagram of a neural network node (neuron)

By way of example, FIG. 2 shows a node i in a neural network that receives a set of inputs $\{u_j\}$ and computes as its output a function of a weighted sum of those inputs:

$$v_i = g\left(\sum_j w_{i,j} u_j\right)$$

Here, g is an "activation function" which may be non-linear, and $\{w_{i,j}\}$ is a set of weights applied at node i. The weights across the network are tuned during training.

Figure 3:
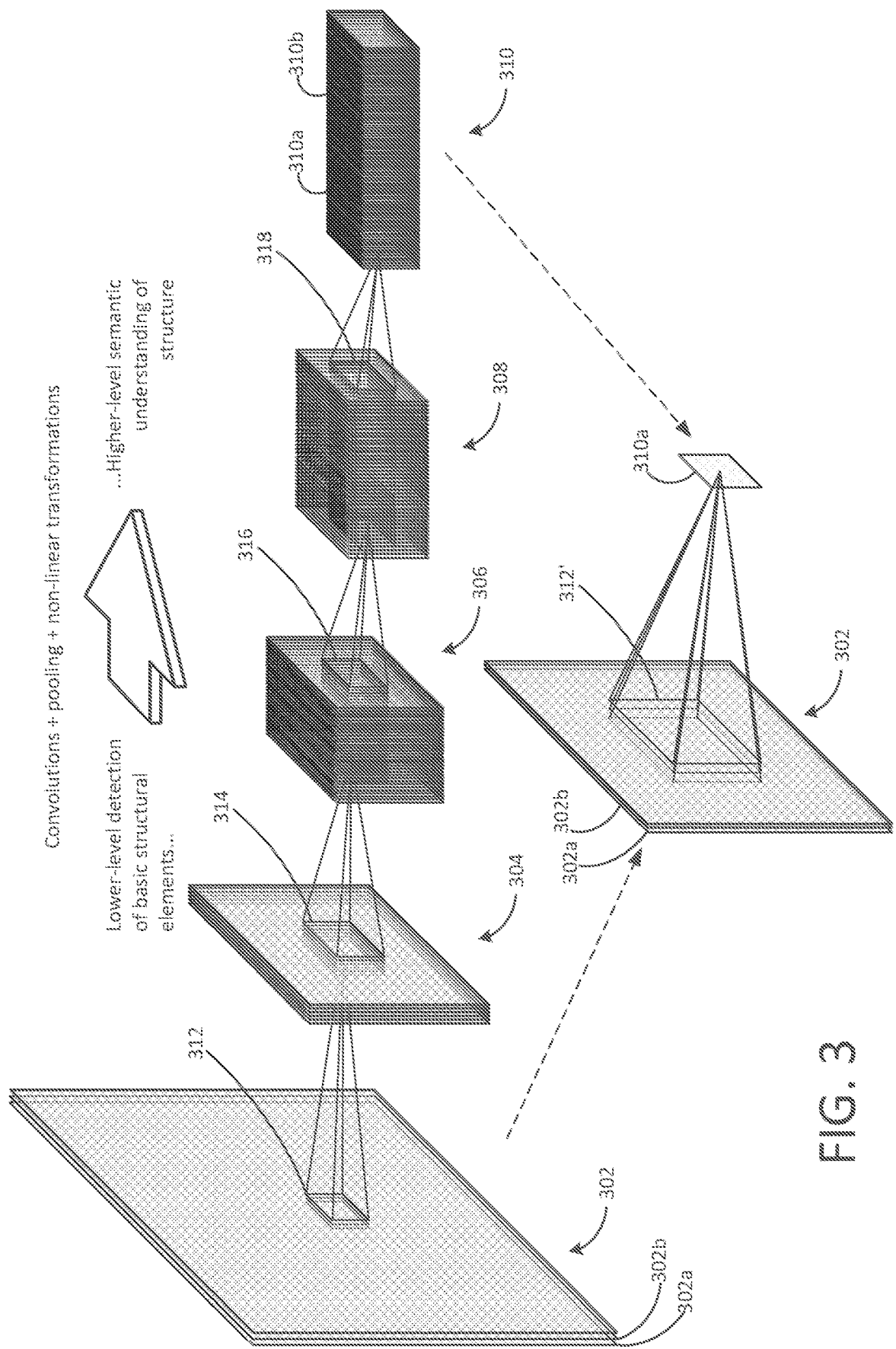
FIG. 3 shows an example of processing performed within a convolutional neural network.

With reference to FIG. 3, it is useful to conceptualize the inputs to and outputs of the layers of a CNN as "volumes" in a discrete three dimensional space (i.e. three dimensional arrays), each formed of a stack of two-dimensional arrays referred to as "feature maps" herein. By way of example FIG. 3 shows a sequence of five such volumes 302, 304, 306, 308 and 310 that may for example be generated through a series of convolution operations, pooling operations and non-linear transformations, as is known in the art. For reference, two feature maps within the first volume 302 are labelled 302a and 302b respectively, and two feature maps within the fifth volume 310 are labelled 310a and 310b respectively. Herein (x,y) coordinates refer to locations within a feature map or image as applicable. The z dimension corresponds to the "depth" of the feature map or image, and may be referred to as the feature dimension. A color image has a depth of three corresponding to the three color channels, i.e. the value at (x,y,z) is the value of color channel z at location (x,y). A volume generated at a processing layer within a CNN has a depth corresponding to a number of filters applied at that layer, where each filter corresponds to a particular feature the CNN learns to recognize.

A CNN differs from a classical neural network architecture in that it has processing layers that are not fully connected. Rather, processing layers are provided that are only partially connected to other processing layer(s). In particular, each node in a convolution layer is connected to only a localized 3D region of the processing layer(s) from which it receives inputs and over which that node performs a convolution with respect to a filter. The nodes to which that node is particularly connected are said to be within a "receptive field" of that filter. The filter is defined by a set of filter weights and the convolution at each node is a weighted sum (weighted according to the filter weights) of the outputs of the nodes within the receptive field of the filter. The localized partial connections from one layer to the next respect (x, y) positions of values within their respective volumes, such that (x, y) position information is at least to some extent preserved within the CNN as data passes through the network.

Each feature map is determined by convolving a given filter over an input volume. The depth (extent in the z-direction) of each convolution layer is thus equal to the number of filters applied at that layer. The input volume itself could be an image or it could be a stack of feature maps that have themselves been determined through convolution. When convolution is applied to an image directly, each filter operates as a low-level structure detector, in that "activations" (i.e. relatively large output values) occur when certain structure is formed by the pixels within the filter's receptive field (that is, structure which matches a particular filter). However, when convolution is applied to a volume that is itself the result of convolution earlier in the network, each convolution is performed across a set of feature maps for different features, therefore activations further into the network occur when particular combinations of lower level features are present within the receptive field. Thus with each successive convolution, the network is detecting the presence of increasingly high level structural features corresponding to particular combinations of features from the previous convolution. Thus in the early layers the network is effectively performing lower level structure detection but gradually moves towards higher level semantic understanding of structure in the later layers. The filter weights are learned during training, which is how the network learns what structure to look for. As is known in the art, convolution can be used in conjunction with other operations. For example, pooling (a form of dimensionality reduction) and non-linear transformations (such as ReLu, softmax etc.) are typical operations that are used in conjunction with convolution within a CNN.

Figure 4:
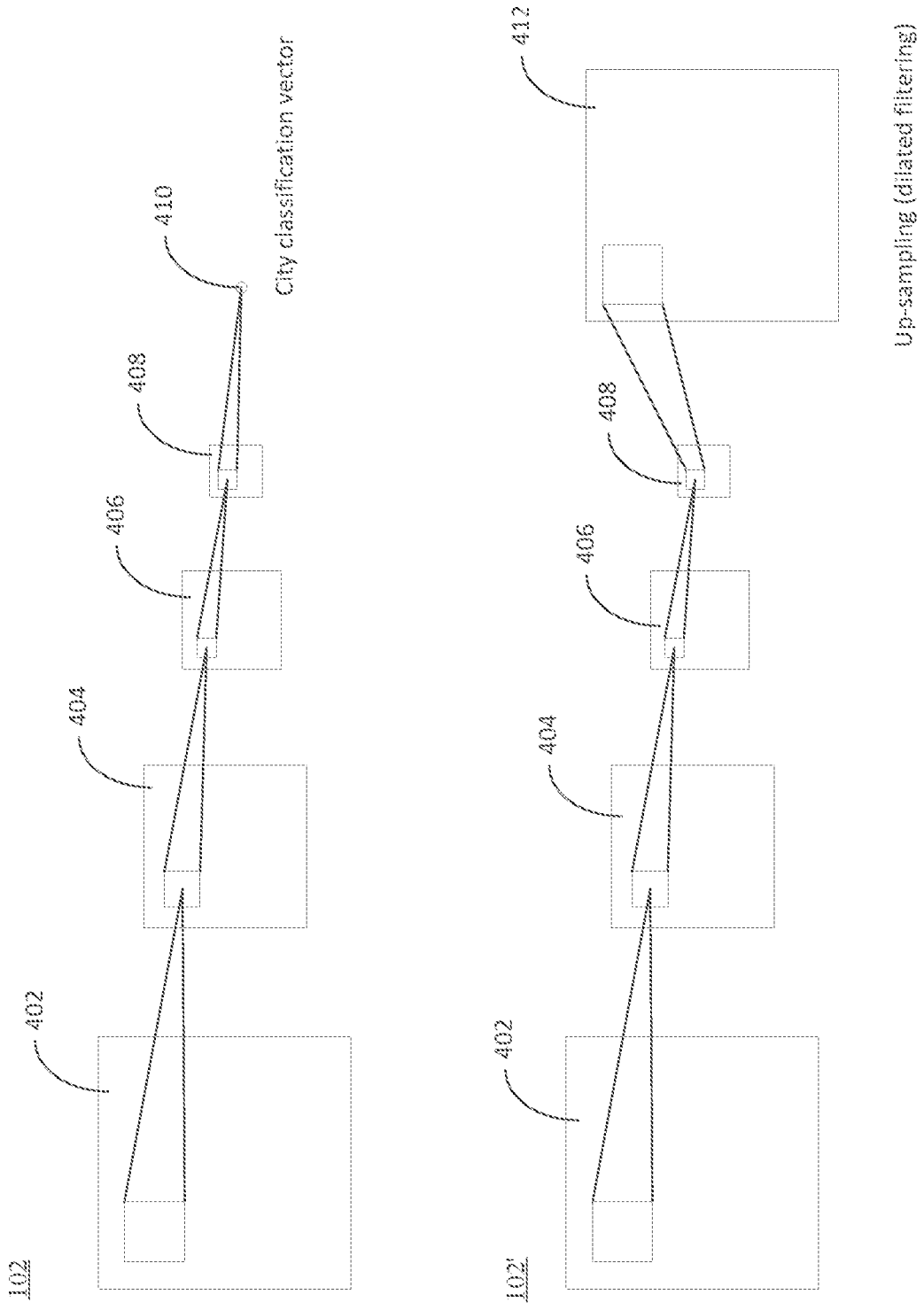
FIG. 4 shows an example of a simplified convolutional neural network architecture that is subject to pre-training on a city classification task and transfer learning.

FIG. 4 shows an example embodiment implemented with a CNN. As shown in the top half of FIG. 4, a CNN is formed initially of five layers 402 (input layer), 404, 406, 408 (intermediate layers) and 410 (initial output layer). An image is received at the input layer 402, and successive transformations (including convolution) are applied at the intermediate layers 404, 406 and 408. Dimensionality reduction in (x,y) coordinates occurs within the network as illustrated. Although not evident in FIG. 4, changes in z-dimensionality (running perpendicular to the place of the page) may occur within the network in dependence on the number of filters applied at each layer. At the output layer 410, an output vector of dimension 1×1×Z is computed where Z is the total number of city names over which the network is pre-trained, and each component of the output vector corresponds to a particular city name. During pre-training, the CNN is trained so as to match the vector at the output layer to the city name labels that have been automatically assigned to the images.

Following pre-training, the architecture of the CNN is modified by discarding the output layer 410 is discarded and replacing it with a new output layer, in the form of a dilated filtering layer 412. Dilated filtering is a form of parameterized up-sampling as is known in the art. The new output layer 412 has the effect of up-sampling the (x,y) dimensionality of the previous layer so that it matches the (x,y) dimensions of the input layer 402. Thus each output at the output layer directly corresponds to one pixel of the original image. The weights of the new output layer are then trained to match the outputs of the new output layer 412 to the ground truth segmentation labels assigned to the fine-tuning data, whilst freezing the weights of the original layers 402-408.

Although only one such new layer 412 is shown in this example, multiple new layers can be incorporated as part of the architecture modification. Likewise, although only one layer 410 is remove in the above example, multiple layers may be removed from the original architecture.

As will be appreciated, this is a simplified example that is presented for the purposes of illustration. The transfer learning techniques of the present disclosure can be applied with a wide range of model architectures, as will be apparent to those skilled in the art.

Mathematically, CNN can be defined in general terms as follows. Let $D=\{x_i, y_i\}_i$ be the training set, such that $x_i$ is an image and $y_i \in C$ is a class label. The convolutional network is a parameterized function approximator, denoted by $f(\bullet; \Theta)$, where $\Theta$ are the parameters of the CNN. The network $f$ maps from the space of images to the space $\Re^{|C|}$ (i.e. a set of real numbers representing the set of possible classes C). Let $f_y(x; \Theta)$ be the $y^{th}$ element of the vector $f(x; \Theta)$. Given the data D, the goal is to optimize the parameters $\Theta$ such that $f_{y_i}(x_i; \Theta)$ is maximized relative to all other elements $f_{y \neq y_i}(x_i; \Theta)$. This is achieved by defining a suitable loss function $\mathcal{L}(\Theta)$, such as cross-entropy loss:

$$\mathcal{L}(\Theta) = \sum_i \left( -f_{yi}(x_i; \Theta) + \log \sum_y \exp(f_y(x_i; \Theta)) \right)$$

One example of a suitable architecture for the CNN is the well-known "AlexNet" parameterization (Alex Krizhevsky, Ilya Sutskever, and Geoffrey E. Hinton. ImageNet classification with deep convolutional neural networks. In NIPS, 2012). AlexNet has become a standard reference architecture in evaluating alternative forms of supervision. For the purpose of training, images in GSV-116 are down-sampled to 384×384. Training is performed by SGD (stochastic gradient descent) with momentum 0.9. Each mini-batch consists of 256 randomly sampled image crops of size 227×227. 300K iterations are performed, with an initial learning rate of $10^{-2}$ and a reduction of the learning rate by a factor of 10 after 100K and 200K iterations.

The AlexNet pre-trained model can be fine-tuned for per-pixel segmentation task using any suitable outdoor road segmentation datasets, for example the CamVid dataset and the KITTI dataset. The task in both these cases is to predict pixel-level semantic labels. For road scene segmentation task, the Alexnet classification network has been converted to the fully-convolution network. For this pool2 and pool5 are removed and replaced with dilated filters so as to increase the receptive field size. This strategy helps to maintain high resolution while calculating loss.

For details of the CamVid dataset see: Paul Sturgess, Karteek Alahari, Lubor Ladicky, and Philip H. S. Torr. Combining appearance and structure from motion features for road scene understanding. In BMVC, 2009.

For details of the KITTI dataset see: Andreas Geiger, Philip Lenz, Christoph Stiller, and Raquel Urtasun. Vision meets robotics: The KITTI dataset. IJRR, 32(11), 2013.

Pre-Training Dataset

By way of example, Table 1 bellows shows an example set of city classes that may be used as a basis for the pre-training phase. The CNN is trained to classify each pre-training image based on its visual content into one of the classes in the dataset.

TABLE 1

Cities that were used for data collection.

| | | | | | | | |
|---|---|---|---|---|---|---|---|
| Andora | Adelaide | Brisbane | Frankfurt | Jerusalem | London | Melbourne | Oslo |
| Amsterdam | Bogota | Chittagong | SaoPaolo | Calgary | LosAngeles | Beijing | Shanghai |
| Quito | Bochum | Hanover | HongKong | Chennai | Delhi | Mumabi | PagoPago |
| Santiago | Taipei | Warsaw | SantaCruz | Sydney | Perth | Tehran | Yokohama |
| Kazan | Kuwait | Kathmandu | Glasgow | Kiev | Enschede | Minsk | Paris |
| Rotterdam | Utrecht | Belfast | Panama | Manila | Wroclaw | Montevideo | Doha |
| Pretoria | Brussels | Dhaka | Hamburg | Krakow | Juba | Montreal | Seville |
| Washington | Seoul | Telaviv | Hague | Riyadh | Thimphu | Edinburgh | Khartoum |
| Bangkok | Bucharest | Kaohshiung | Hamilton | Kualalumpur | Birmingham | Moscow | Bristol |
| Barcelona | Leeds | Liverpool | Helsinki | LaPaz | Manchester | Munich | Notingham |
| Belgrade | BuenosAires | Dubai | Kiev | SanFrancisco | Mariehamn | Caracas | Harare |
| Tokyo | Zurich | Cambridge | Toronto | Sofia | Ulaanbaatar | Stockholm | Vancouver |
| Bergen | Canberra | Dublin | Istanbul | Rome | StPetersburg | Capetown | Jakarta |

High-capacity visual representations require large training sets. In order to generate such large training set, a set of videos can be collected and automatically labelled according to the location of the image attached to that video. These videos can for example be downloaded from the Internet by searching using a specific city name. Many such videos have been uploaded to popular public content sharing platforms by many users and drivers who have captured driving scenes using dash cams.

There are 64 capital cities and other 40 major cities that have large population in their country, such as New York and Los Angeles in the United States, Sydney and Melbourne in Australia, Rio de Janeiro in Brazil, and Guayaquil in Ecuador. The resulting list of 104 cities is shown in Table 1.

In order to collect a balanced dataset, around 2-3 videos may be downloaded from each city, each video roughly 20-30 mins long. Around 2000 images can then be selected from each city, thereby obtaining a dataset of around 2000K images in total. As will be appreciated, this is a highly efficient way of generating a sizeable pre-training dataset.

The total number of classes is almost 10 times less than the well-known ImageNet dataset but there are more image per class. Further, the images per city class can be easily extended by further crawling of the Internet, or by capturing a relatively small number of additional street scene videos of moderate length.

Order Recognition:

A further example transfer learning methodology will not be described that leverages an order recognition task on image sequences. Training inputs are generated as short sequence of frames extracted from a video (e.g. three frames in the following examples), which may be in order (i.e. the correct temporal order in which they were captured) or out of order.

A learning problem for a convolution neural network is formulated objectively as one of classifying short sequences of video frames (frame images) extracted from a video (video image) as ordered or unordered based on their visual content. This is a straightforward binary classification task which is referred to herein as an order recognition task. In order to generate training set, short subsequences of three or more consecutive frame images (pre-training image sequences) are extracted from video images. A randomized reordering process is applied to the extracted subsequences such that, on average, about 50% of the subsequences retain their original ordering (i.e. remain ordered) and about 50% of the subsequences are unordered.

The frame images extracted for each pre-training image sequence may be consecutive frame images in the video image from which they are extracted, but this is not essential: what matters is that the extracted frames span a short enough time period in the original video that they exhibit sufficient identifiable visual correlations with each other to allow the CNN to distinguish between ordered and unordered frames.

In this context, ordered means that all frames that are temporarily adjacent (or nearest neighbours) in the original video image remain adjacent (or nearest neighbours) in the pre-training image sequence (i.e. the order is the same or reversed), whereas unordered means that at least two frames that were temporally adjacent in the original video image are no longer temporary adjacent (or nearest neighbours) in the pre-training image sequence (i.e. an order other than the same or reversed).

Having pre-trained the model on this order recognition task, it can then be fine-tuned to a per-pixel semantic segmentation task or other desired image processing task.

Such embodiments can for example be applied to street scene images, of the kind that would be encountered by an AV in use, to generate a large pre-training set of annotated street scene images automatically. Accordingly the described techniques have particular applicability in the context of autonomous driving (and particularly urban driving), where autonomous driving decisions are made based on the results of image processing applied to street scene images, as both the pre-training and the fine-tuning can be performed on the type of images that an AV will actually encounter in use.

However, the present disclosure is not limited in this respect and can be implemented using any form of video image that exhibits temporal variations in its visual content. Thus it will be appreciated that, although the following is described in relation to street scene images, the description applies equally to other forms of training image sequence.

The CNN pre-trained for the order recognition task can then be transferred to semantic segmentation or other desired image interpretation tasks on urban road scene datasets, in the manner described below.

The fine-tuning phase is performed using training data that is specific to the desired image processing task. For example, for an image segmentation task, this would require a set of fine-tuning images that are labelled at the pixel-level; for object/structure recognition, this would require a set of fine-tuning images that are labelled at the applicable object/structure level. However, because this is leveraging the knowledge gained by the model in pre-training, significantly less training data is required in the transfer learning phase to achieve a desired level of accuracy on the desired image processing task. For instance, the inventor has been able to achieve acceptable accuracy on an image segmentation task with only a few hundred training images that are labelled at the pixel level, following pre-training on the order recognition task.

It will be appreciated that, although the following is described in relation to image segmentation, the present disclosure is not limited in this respect and can be extended to other desired image processing tasks.

Returning to FIG. 1, in the context of the order recognition task, the annotation data 106 may simply identify the training image sequence 104 as ordered or unordered.

As above, the pre-training annotation data 106 is generated automatically, with no or minimal human input, by the training data collection algorithm 107. In this case, training image sequences 104 can be extracted by the algorithm 107 from video images 108 that can for example be obtained from one or more online video databases 109. As indicated, the training data collection algorithm 106 applies a randomized reordering process to the pre-training image sequences, such that on average 50% remain ordered and 50% become unordered (i.e. 50% probability either way). This provides a balanced training pre-set 100.

Figure 10:
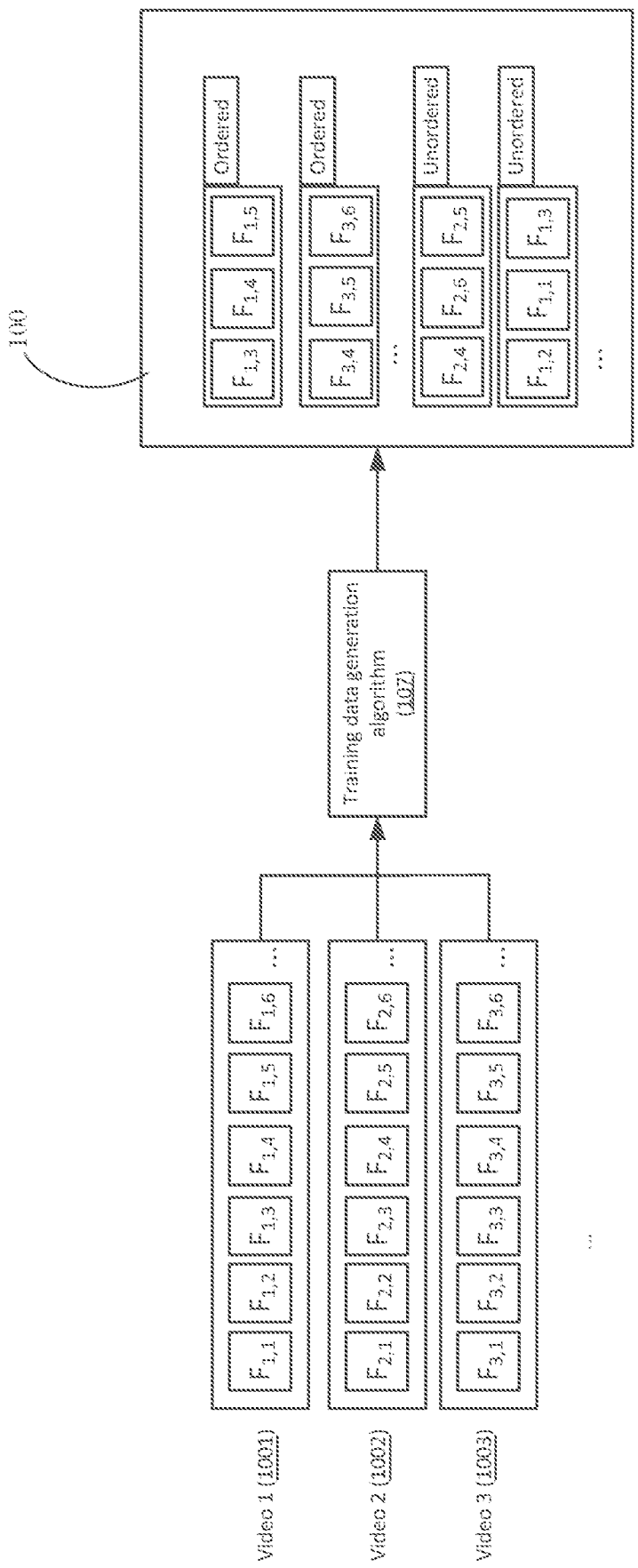
FIG. 10 shows a schematic block diagram for a system for generating training data and annotations automatically for order recognition training.

By way of example, FIG. 10 shows on the left hand side a plurality of video images 1001, 1002 and 1003, each comprising a respective temporal sequences of frames. The frame at time t in video n is denoted $F_{n,t}$. On the right hand side, a balanced mixture of ordered and unordered pre-training image sequences—as generated and labelled accordingly by the training data generation algorithm 107—are shown.

The CNN 102 is trained based on the training image sequences 104 so as to match its output $f(U)$ to the corresponding annotation data 106. For example, $f(U)$ may be a two-component vector with the components corresponding to ordered and unordered respectively, or it may be a binary (e.g. 0/1) output value. This is a recursive process, in which image data of the training images are systematically inputted to the CNN 102, and the initial model parameters 103 of the CNN 102 are systematically adapted in an attempt to optimize a cost function that provides a measure of difference between the output $f(U)$ and the corresponding annotation data 106 for each of the training images (the cost or error). The aim of training is to minimize the cost function to the extent it can be minimized without overfitting. The training can be based on a computation of the gradient of the objective function with respect to the model parameters, e.g. using SGD in combination with backpropagation.

Once the CNN 102 has been pre-trained in this manner to perform the task of classifying training image sequences as ordered/unordered, the pre-trained model 102 is fine-tuned to the semantic segmentation task (bottom of FIG. 1). Generally this involves adapting the initial architecture to incorporate additional parameters 113, and possibly removing some of the initial parameters 103 that were learned in pre-training.

FIG. 9 shows an example embodiment implemented with a CNN. As shown in the top half of FIG. 4, a CNN is formed initially of three subnetworks (subnets) 900a, 900b and 900c. Each subset 900n is shown to comprise five respective layers 902n (input layer), 904n, 906n (intermediate layers) and 908n (output layer of that subset) for n=a,b,c. In this example, the three subnets 900a-900c are provided for receiving first second and third images 104a, 104b 104c of each pre-training image sequence 104. That is, each subnet 900n receives the image 900n at location in the pre-training image sequence associated with that subset 900n. In each subnet, the relevant image 900n is received at the input layer 902n thereof, and successive transformations (including convolution) are applied at the intermediate layers 904n, 906n and 908n. Dimensionality reduction in (x,y) coordinates occurs within the network as illustrated. Although not evident in FIG. 4, changes in z-dimensionality (running perpendicular to the place of the page) may occur within the network in dependence on the number of filters applied at each layer. The outputs of the final layers 908a, 908b, 908c are volumes of dimension X×Y×Z. There are concatenated across the z-dimension at block 909 to form a concatenated volume of dimensions X×Y×3Z.

The CNN 102 is also shown to comprise a final output later 901, which received the concatenated volume and computes therefrom a final output. This can for example be a two-dimensional vectors (components corresponding to ordered/unordered respectively), or a binary value. During pre-training, the CNN is trained so as to match this final output to the ordered/unordered labels that have been automatically assigned to the pre-training image sequences.

Following pre-training, the architecture of the CNN is modified so that it can be adapted to a single-image segmentation task. In order to accommodate this, two of the subnets are simply "discarded" (subnets 900b and 900c in this example), and only one subnet (900a) is retained. The subnets 900a, 900b and 900c may each apply the same set of weights, and in that case, no information is actually discarded; rather, at the end of pre-training, there is a common set of learned feature extraction weights that was applied in each subnet 900a, 900b, 900c, and which can now be deployed in other contexts.

The final output layer 910 is also discarded, and replaced with a new output layer, in the form of a dilated filtering layer 912. Dilated filtering is a form of parameterized up-sampling as is known in the art. The new output layer 912 has the effect of up-sampling the (x,y) dimensionality of the previous layer 908a so that it matches the (x,y) dimensions of the input layer 902. Thus each output at the output layer directly corresponds to one pixel of the original image. The weights of the new output layer are then trained to match the outputs of the new output layer 912 to the ground truth segmentation labels assigned to the fine-tuning data, whilst freezing the weights of the original subset 900a.

Although only one such new layer 912 is shown in this example, multiple new layers can be incorporated as part of the architecture modification. Likewise, although in the above, the retained subset 900a is unmodified, one or more layers thereof could be removed. Moreover, although in the above the architecture is designed for pre-training image sequences of length three, as will be appreciated longer pre-training image sequences can be accommodated with additional subsets.

As will be appreciated, this is a simplified example that is presented for the purposes of illustration. The transfer learning techniques of the present disclosure can be applied with a wide range of model architectures, as will be apparent to those skilled in the art.

Figure 6:
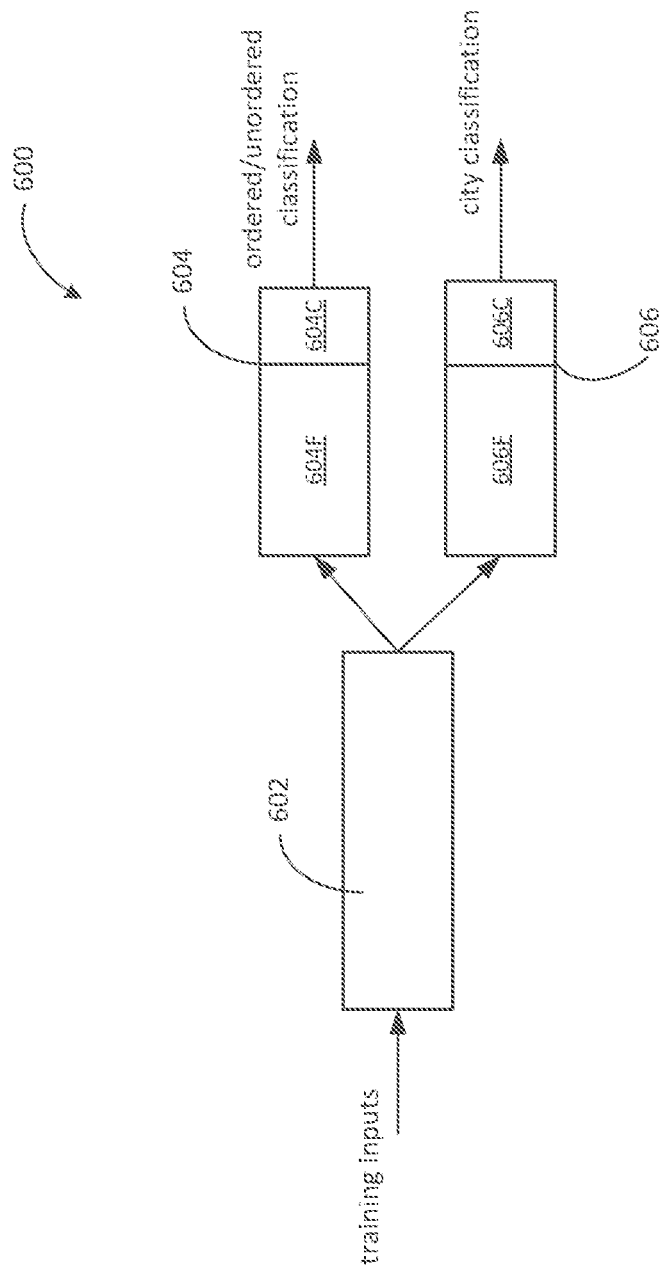
FIG. 6 shows a schematic block diagram of trainable model having an extended CNN architecture, which can be trained to simultaneously classify image sequences based on ordering and city of capture.

Multiple Objective Tasks:

FIG. 6 shows a schematic block diagram of trainable model 600 having an extended CNN architecture, which can be trained to simultaneously classify such pre-training image sequences based on ordering and city of capture. The model comprises an initial processing component 602, to which is connected an ordering classification component 604 and a city classification component 606. The initial processing component 602 operates as a common feature extractor, to extract a common set of features (common feature set) from an input image sequence that are provided to both the ordering classification component 604 and the city classification component 606. The ordering classification component 604 and city classification component 606 operate in parallel, to classify an input image sequence as ordered/unordered and according to its city of capture respectively, based on the common set of features extracted by the common feature extractor 602. The initial processing component 602 applies a series of convolutions and non-linear transformations to an input image received thereat according to a first subset of model weights $\Phi_1$, in order to extract the common feature set.

The ordering classification component 604 and the city classification component 606 apply further convolutions and non-linear transformations to the common feature set provided by the common feature extractor 602, in order to refine the common feature set for the tasks of ordering classification and city classification respectively. These are applied according to second and third subsets of model weights $\Phi_2$, $\Phi_3$ by respective feature extraction layers labelled 604F and 606F respectively. The refined feature sets by the feature extraction layers 604F, 606F of the ordering and city classification components 604, 606 are referred to below as the ordering classification feature set and city classification feature set respectively. The ordering and city classification components 604, 606 each comprise at least one classification layer, labelled 604C and 606C respectively, which performs the applicable classification task based on the refined feature set determined by the feature extraction layers of that component.

The model 600 is trained end-to-end based on loss function which may be defined as follows:

$$\mathcal{L}(\Phi) = \mathcal{L}_{ordering}(\Phi_1, \Phi_2) + \mathcal{L}_{city}(\Phi_1, \Phi_3)$$

Here, $\Phi$ is the full set of weights applied by the model 600; $\Phi_1$, $\Phi_2$ and $\Phi_3$ are the subsets of $\Phi$ that are applied by the common feature extractor 602, the ordering classification component 604 and the city classification component 606 respectively.

Each training image sequence is automatically assigned ground truth labels, denoting (i) whether it is ordered or unordered (ordering label) and (ii) the city of capture of each of its training images (city label), in the manner described above.

$\mathcal{L}_{ordering}(\Phi_1, \Phi_2)$ is a an ordering loss, which penalizes any deviation between an output of the ordering classification component 604 and the ground-truth ordering label for each training image sequence.

$\mathcal{L}_{city}(\Phi_1, \Phi_3)$ is a city loss, which penalizes deviations between an output of the ordering classification component 606 and the ground-truth city label for each training image sequence.

Note that not every training sequence needs to have both types of label: for partially labelled training sequences (e.g. sequences for which city data is unavailable), the loss term for which no corresponding label is provided (e.g. the city loss) can be defined to be zero.

Figure 6A:
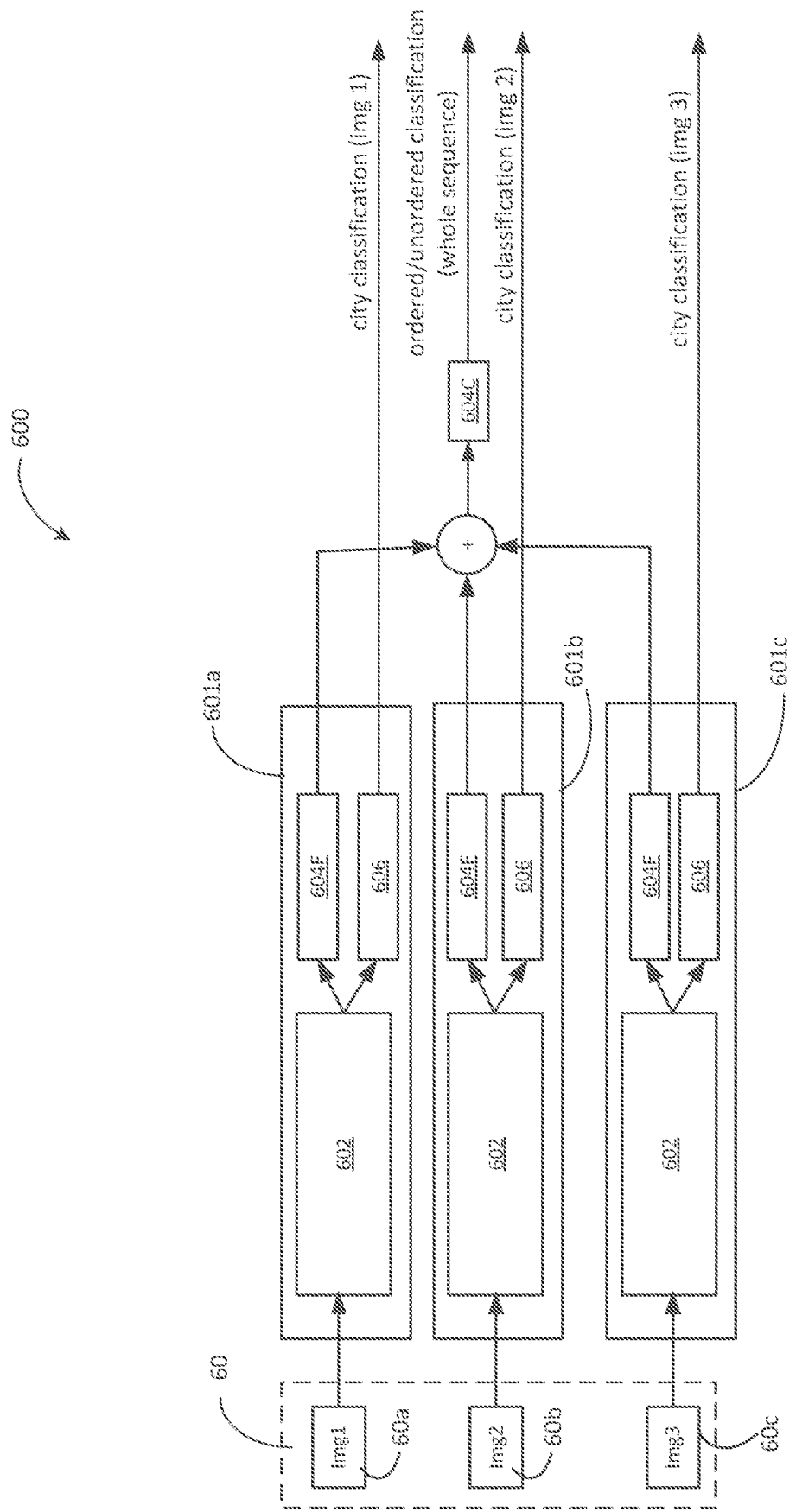
FIG. 6A shows further details of the architecture of FIG. 6 in one example.

FIG. 6A shows further details of the architecture of FIG. 6 in one example. In this example, each input sequence 60 is formed of three images (60a, 60b, 60c) which are processed by sub-networks (subnets) 601a, 601b and 601c respectively. The subnets 601a, 601b and 601c have shared weights, i.e. each applies the same weights to its inputs. Each of the subnets 601a, 601b, 601c executes the common feature extractor 102, the (full) city classification component 606 and the feature extraction layers 604F of the ordering classification component 604.

Each image is classified individually according to its city of capture, by the city classification component 606 of the applicable subnet, as described above.

The feature sets determined for the images of the sequence by the ordering feature extraction layer(s) 604F of the subsets 601a, 601b, 601c are combined (e.g. concatenated). The resulting combined (e.g. concatenated) ordering feature set represents the sequence of images as a whole, and is provided to the ordered/unordered classification layer(s) 604C to allow the sequence to be classified as ordered/unordered.

With this architecture, only the ordering classification layer(s) 604C operate across the sequence as a whole, based on the concatenated ordering classifications feature sets determined for the images individually.

Figure 7:
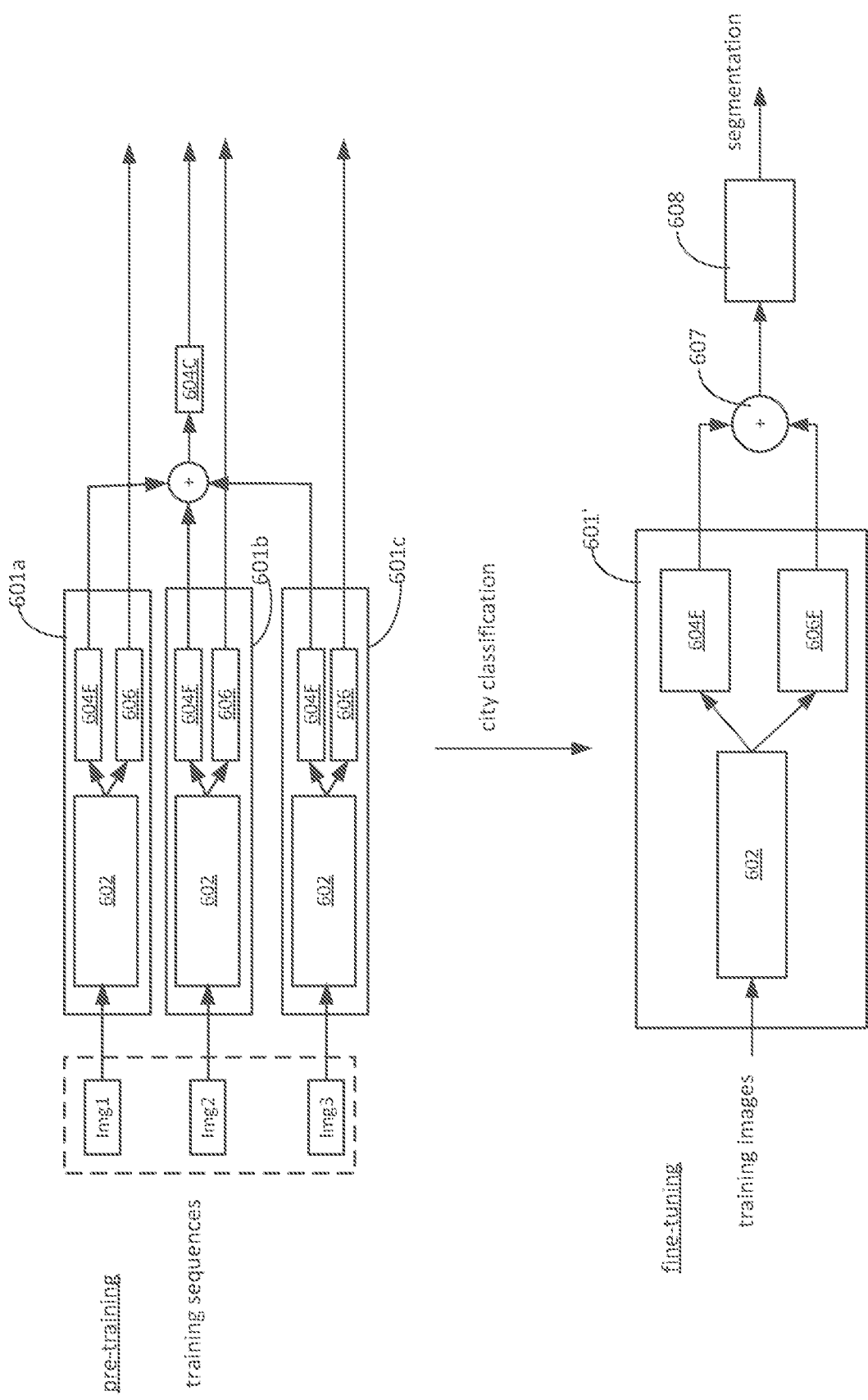
FIG. 7 shows one example of a feature extractor obtained though pre-training on both an order recognition and city classification.
Figure 7A:
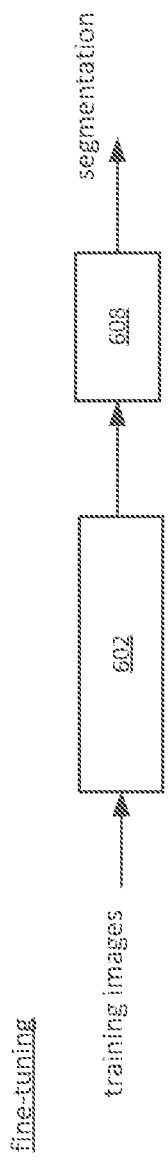
FIG. 7a shows an alternative feature extractor obtained though pre-training on both order recognition and city classification.

Alternatively, with reference to FIG. 7A, the city classification and ordering classification components 606, 604 may be discarded altogether after training, in which case the segmentation component 608 operates directly on the common feature set determined by the (now pre-trained) common feature extractor 602.

Multi-Task Approaches

The above can be implemented in a multi-task approach, in which a network is trained to simultaneously classify training inputs extracted from a video sequence (i) according to their city of capture as described above and (ii) according to their time ordering relative to the video sequence from which they have been extracted. In this context, each training input is a short sequence of frames which is extracted from a video and which may be ordered or unordered.

Alternatively or additionally, one or both of city classification and order recognition can be combined with some other desired image processing task in a multi-task approach.

Multi-Task—Example 1

With reference to FIG. 7, with a transfer learning approach, the above can be performed as a pre-training phase.

In fine-tuning, the city classification layer(s) 606C and ordering classification layer(s) 604C may be removed. For image-segmentation, the fine-tuned network operates on single images. This is achieved by effectively taking a single subnet, modifying it to remove the city classification layer(s) 606C, and combining the outputs of the city and ordering feature extraction layers 604F and 606F. The modified subnet is labelled 601'. The outputs of the ordering feature extraction layer(s) 604F and the city feature extraction layer(s) 606F are combined (e.g. concatenated), at block 607 and provided to a segmentation component 608, which up-samples the combined feature set according to a set of weights $\phi_4$. This upsampling may for example comprise dilated filtering. The segmentation weights $\phi_4$ are then tuned to match them to segmentation ground truth feature maps for a small set of fine-tuning data, in the manner described above, whilst keeping the original weights $\Phi_1$, $\Phi_2$, $\Phi_3$ (as learned in pre-training) frozen.

This particular example uses pre-training/fine-tuning, with a multi-task loss function in the pre-training phase that combined city classification and order recognition.

Multi-Task—Example 2

Figure 8:
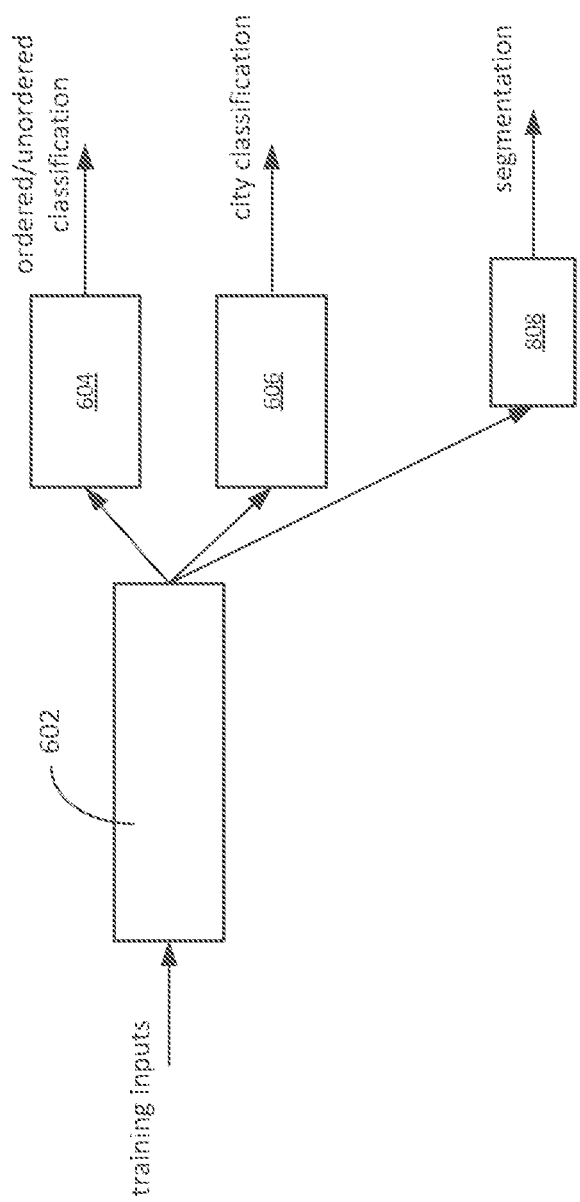
FIG. 8 shows a multi-task training architecture that simultaneously trains on order recognition, city classification and a desired image processing task.

With reference to FIG. 8, an alternative approach incorporates segmentation into a multi-task loss directly. In this case, a segmentation component 808 is connected to the common feature extractor 602 directly, along with one or both of the ordering classification component 606 and city classification component 606. Hence each of those components 604 and/or 606 and 808 determines its respective output by convolving the common feature set extracted by the common feature extractor 602. This avoids the need for pre-training and separate fine-tuning, as the model is simultaneously trained to perform segmentation and one or both of ordered/unordered classification and city classification. In this case, a training loss is defined as:

$$\mathcal{L} = \mathcal{L}_{segmentation} + \mathcal{L}_{ordering} + \mathcal{L}_{city}$$

$\mathcal{L}_{segmentation}$ is a segmentation loss which penalizes differences between the output of the segmentation component 808 and ground truth segmentation labels for training images that have such labels; for images which do not (the majority), the segmentation loss is zero.

Figure 8A:
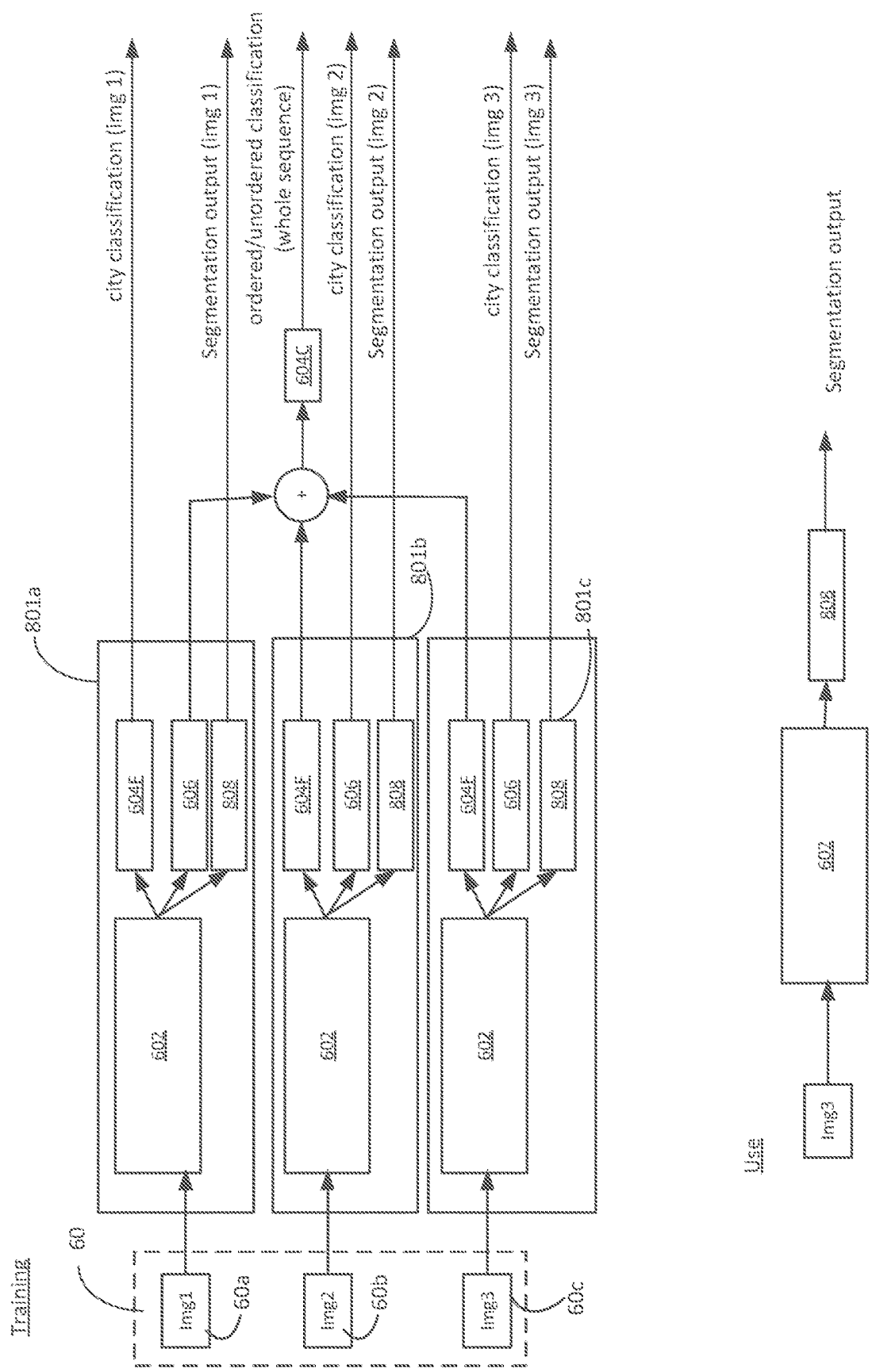
FIG. 8A shows further details of the architecture of FIG. 8 in one example.

FIG. 8A shows further details of an architecture that may be adopted for training in one example. Similar to FIG. 6A, three parallel subnets 801a, 801b, 801c are provided, the only difference being that each subset 801a-c now additionally executes the segmentation component 808, which determines a segmentation output for the individual image received at that subset.

Once trained, in use, only the common feature extractor 602 and the segmentation component 808 need be retained.

With only one of ordering classification and city classification being learned simultaneously with segmentation, the loss has only two terms:

$$\mathcal{L} = \mathcal{L}_{segmentation} + \mathcal{L}_{ordering}$$

or $$\mathcal{L} = \mathcal{L}_{segmentation} + \mathcal{L}_{city}$$

Use-Case—Autonomous Driving

An autonomous vehicle, also known as a self-driving vehicle, refers to a vehicle which has a sensor system for monitoring its external environment and a control system that is capable of making and implementing driving decisions autonomously using those sensors. This includes in particular the ability to automatically adapt the vehicle's speed and direction of travel based on inputs from the sensor system. A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver.

Figure 5:
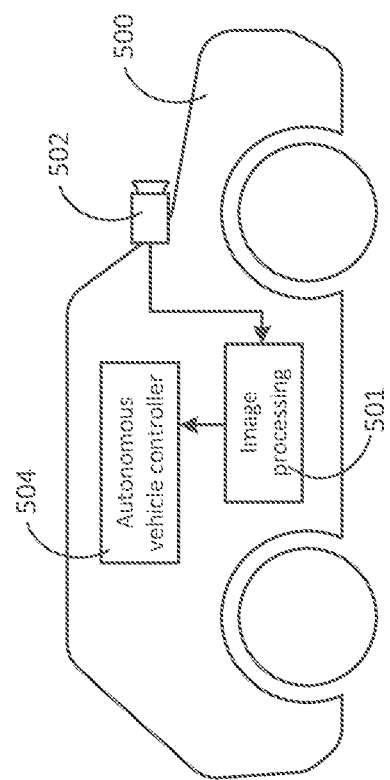
FIG. 5 shows a highly schematic block diagram of an autonomous vehicle in which a convolutional neural network is used to perform image processing.

FIG. 5 shows a highly-schematic block diagram of an autonomous vehicle 500, which is shown to comprise an instance of an image processing component 501, as trained in accordance with any of the above examples to perform a desired image processing task such as image segmentation. The image processing component 501 has an input connected to an image capture device 502 of the vehicle 500 and an output connected to an autonomous vehicle controller 504. In use, the image processing component 501 of the autonomous vehicle 500 applies image processing to images captured by the image capture device 502, in real time, in accordance with its training, and the autonomous vehicle controller 504 controls the speed and direction of the vehicle based on the results, with no or limited input from any human. The vehicle 500 is a car in this example, but it can be any form of vehicle.

The image processing component 501 and autonomous vehicle controller 504 are functional components of the autonomous vehicle 500 that represent certain high-level functions implemented within the autonomous vehicle 500. These components can be implemented in hardware or software, or a combination of both. For a software implementation, the functions in question are implemented by one or more processors of the autonomous vehicle 100 (not shown), which can be general-purpose processing units such as CPUs and/or special purpose processing units such as GPUs. Machine-readable instructions held in memory cause those functions to be implemented when executed on the one or more processors. For a hardware implementation, the functions in question can be implemented using special-purpose hardware such as application-specific integrated circuits (ASICs) and/or field programmable gate arrays (FPGAs).

Although image segmentation has been presented above as a desired image interpretation task, the subject matter is not limited in this respect, and a model that has been pre-trained for city classification and/or order recognition can be fine-tuned to other desired image interpretation tasks.

One example is object detection, wherein the task is one of detecting specific types of object (e.g. vehicles, pedestrians etc.) and their locations and/or orientation (pose) and/or size in images. This may be effected by determining a predicted bounding box around the object in question.

Another example is image classification. For example, in the context of autonomous driving, a useful image classification task is determining the current weather or overall lighting conditions from images (as this can inform decision making). In this case, after pre-training the model to classify images according to city of capture and/or order recognition, it can be fine-tuned based on a small amount of manually annotated data to classify images according to weather or lighting conditions (e.g. night/day). Another example is determining whether an AV is in an area it has been before (familiar vs unfamiliar areas).

A computer system may comprise execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

Another aspect herein combines city classification with ordered/unordered video classification, in a pre-training phase or in a multi-task training phase.

Another aspect herein uses order recognition pre-training, fine-tuned to segmentation.

Another aspect herein provides a multi-task approach, where instead of pre-training and fine-tuning, segmentation loss (or more generally a loss term for a different image processing task) is incorporated into the same loss function as city classification and/or ordering classification.

One aspect herein provides a method of training a machine learning (ML) model to perform an image processing task, the method comprising the following steps: at a computer system, receiving a plurality of images and associated geographical data for determining a geographical region in which each image was captured; assigning to each of the images a training label denoting the geographic region in which it was captured; in a pre-training phase, using the images and their assigned training labels to pre-train the ML model to perform a task of distinguishing between images captured in different geographic regions based on their visual content; and in a transfer learning phase, fine-tuning the pre-trained ML model to perform a desired image processing task other than distinguishing between images captured in different geographic regions.

In embodiments, the images may comprise outdoor road images.

The outdoor road images may have been captured by one or more travelling vehicles.

The geographic data may denote a city in which each image was captured, and the ML model may be pre-trained to distinguish between images captured in different cities.

The training labels may be assigned to the images automatically, based on the associated geographic data, by a training data creation algorithm executed in the computer system.

The desired image processing task may be an image segmentation task, a structure detection task, or an image classification task.

The desired image processing task may be a task of classifying images according to weather, lighting conditions or familiarity.

The images may be frame images extracted from video images with which the geographic data is associated, wherein each extracted frame image is assigned its training label based on the geographic data associated with the video image from which it is been extracted.

The video images may be obtained by searching at least one video database using geographic search terms, wherein the geographic data associated with each video image comprises a geographic search term used to obtain the image.

The ML model may be a neural network.

The neural network may be a convolutional neural network.

The pre-trained ML model may be fine-tuned based on a second set of training inputs and second training labels assigned thereto.

The model may be trained in the pre-training phase by tuning initial parameters of the ML model based on the training inputs and their assigned training labels. The fine-tuning of the pre-trained ML model may comprise incorporating additional parameters into the ML model and tuning the additional parameters based on the second training inputs.

The initial parameters may be frozen in the transfer learning phase.

The fine-tuning of the pre-trained ML model may comprise removing some of the initial parameters.

The fine-tuning of the pre-trained neural network may comprise removing one or more neural network layers.

A further aspect herein provides a method of training a machine learning (ML) model to perform an image processing task, the method comprising the following steps: at a computer system, receiving video images, each video image comprising a temporal sequence of frame images; determining from the video images a set of pre-training image sequences, each of which is determined by: selecting a plurality of frame images from one of the video images, and determining an ordering for the frame images in the pre-training image sequence; assigning to each of the pre-training image sequences a training label based on the determined ordering of the frame images therein; in a pre-training phase, using the pre-training image sequences and their assigned training labels to pre-train the ML model to perform a task of determining information about the ordering of images in image sequences based on their visual content; and in a transfer learning phase, fine-tuning the pre-trained ML model to perform an image processing task other than determining information about the ordering of images in image sequences.

Each pre-training image sequence may comprise at least three extracted frame images, wherein some of the pre-training image sequences may be ordered and the rest may be unordered. The training label assigned to each pre-training image sequence may indicate whether the pre-training sequence is ordered or unordered, and the ML model is pre-trained to distinguish between ordered and unordered image sequences.

The ordering may be determined for each pre-training image sequence by applying a randomized reordering process to the extracted frame images to selectively reorder them.

The randomized reordering process may be applied such that the extracted frame images in each pre-input training sequence have an equal probability of remaining ordered or becoming unordered.

The frame images extracted for each pre-training image sequence may be consecutive frame images in the video image from which they are extracted.

The images may comprise outdoor road images.

The outdoor road images may have been captured by one or more travelling vehicles.

The pre-training image sequences may be determined and the training labels may be assigned to the pre-training image sequences automatically by a training data creation algorithm executed in the computer system.

The desired image processing task may be an image segmentation task, a structure detection task, or an image classification task.

The desired image processing task may be a task of classifying images according to weather, lighting conditions or familiarity.

The ML model may be a neural network.

The neural network may be a convolutional neural network.

The pre-trained neural network may comprise a plurality of sub networks, each of which receives one image of each pre-training image sequence, wherein the outputs of the sub networks are combined and the neural network is trained based on the combined output.

The fine-tuning of the pre-trained network may comprise discarding all but one of the pre-trained subset networks.

Each of the sub networks may apply a common set of weights.

The pre-trained ML model may be fine-tuned based on a second set of training inputs and second training labels assigned thereto.

The model may be trained in the pre-training phase by tuning initial parameters of the ML model based on the pre-training image sequences and their assigned training labels. The fine-tuning of the pre-trained ML model may comprise incorporating additional parameters into the ML model and tuning the additional parameters based on the second training inputs.

The initial parameters may be frozen in the transfer learning phase.

The fine-tuning of the pre-trained ML model may comprise removing some of the initial parameters.

The fine-tuning of the pre-trained neural network may comprise removing one or more neural network layers.

A further aspect herein provides an executable ML model which is embodied in a computer readable storage medium and which has been trained in accordance with method herein.

A further aspect provides an image processing system comprising execution hardware configured to execute the ML model in order to perform the desired image processing task.

A further aspect provides an autonomous vehicle comprising: at least one image capture device; the above image processing system, coupled to the image capture device for applying the desired image processing task to images captured thereby; and a control system configured to control the operation of the autonomous vehicle based on the results of the desired image processing task.

A further aspect herein provides a computer program product for programming one or more computers to carry out any method herein.

Embodiments may combine the two aforementioned aspects with a multi-loss function having all three of the above terms, where the labels "first", "second" and "third" term may assigned arbitrarily to distinguish between the three terms where convenient to do so.

The desired image processing task may be an image segmentation task, a structure detection task, or an image classification task.

This is an alternative to the pre-training/fine-tuning (transfer learning) architecture set out above. All of the description herein pertaining to the pre-training and fine-tuning phases apply equally to the corresponding term of the multi-task loss function.

It will be appreciated that, whilst specific embodiments of the invention have been described, these are not exhaustive. The scope of the invention is not defined by the described embodiments but only by the appendant claims.

The invention claimed is:

1. A method of training a machine learning (ML) model to extract features from images, the method comprising:
   at a computer system, receiving video images, each video image comprising a temporal sequence of frame images, with associated geographical data for determining a geographical region in which each video image was captured;
   determining from the video images a set of training image sequences, each training image sequence comprising sequenced frame images selected from one of the video images, wherein for at least some of the training image sequences, the sequenced frame images are sequenced in an order different than the video image from which the sequenced frame images have been extracted;
   assigning, to each training image sequence:
      (a-i) an ordering training label denoting an order of the sequenced frame images in the training image sequence, and
      (a-ii) a geographic training label denoting a geographic region in which at least one of the frame images was captured;
   using each training image sequence, the ordering training label, and the geographic training label to train the ML model to perform tasks of:
      (b-i) determining information about an order of sequenced frame images in image sequences based on their visual content, and (b-ii) distinguishing between frame images or image sequences captured in different geographic regions based on their visual content.

2. The method of claim 1, wherein the ML model is trained to perform the tasks of (b-i) and (b-ii) in a pre-training phase, the method further comprising, in a fine-tuning phase, fine-tuning the trained ML model to perform (b-iii) an image processing task other than the tasks of (b-i) and (b-ii).

3. The method of claim 2, wherein the ML model is fine-tuned based on a second set of training inputs and training labels assigned thereto.

4. The method of claim 3, wherein the model is trained by tuning initial parameters of the ML model based on the training inputs and their assigned training labels;
wherein the fine-tuning of the ML model comprises incorporating additional parameters into the ML model and tuning the additional parameters based on the second training inputs.

5. The method of claim 4, wherein the initial parameters are frozen in a transfer learning phase.

6. The method of claim 4, wherein the fine-tuning of the ML model comprises removing some of the initial parameters.

7. The method of claim 6, wherein the fine-tuning of the ML model comprises removing one or more neural network layers from the ML model, the removed initial parameters contained in the removed neural network layers.

8. The method of claim 2, wherein the image processing task is an image segmentation task, a structure detection task, or an image classification task.

9. The method of claim 8, wherein the image processing task is a task of classifying images according to weather, lighting conditions or familiarity.

10. The method of claim 1, wherein the ML model is trained based on a multi-task loss function having:
a first term which trains the ML model to perform the task of (b-i),
a second term that trains the ML model to perform the task of (b-ii), and
a third term that trains the ML model to perform (b-iii) a desired image processing task other than the tasks of (b-i) and (b-ii),
wherein the ML model learns the tasks of (b-i), (b-ii) and (b-iii) simultaneously.

11. The method of claim 1, wherein the images comprise outdoor road images.

12. The method of claim 11, wherein the outdoor road images have been captured by one or more travelling vehicles.

13. The method of claim 1, wherein the geographical data denotes a city in which each image was captured, and the ML model is pre-trained to distinguish between images captured in different cities.

14. The method of claim 1, wherein the video images are obtained by searching at least one video database using geographic search terms, wherein the geographical data associated with each video image comprises a geographic search term used to obtain the image.

15. The method of claim 1, wherein the geographic training labels and the ordering training labels are assigned automatically by a training data creation algorithm executed in the computer system.

16. Executable program instructions embodied on non-transitory computer-readable media and configured, when executed by one or more computer processors, to implement a training method comprising:
receiving video images, each video image comprising a temporal sequence of frame images;
determining from the video images a set of training image sequences, each training image sequence comprising sequenced frame images selected from one of the video images, wherein for at least some of the training image sequences, the frame images are sequenced in an order different than the video image from which the frame images have been extracted;
assigning, to each training image sequence, an ordering training label denoting the order of the sequenced frame images in the training image sequence;
using each training image sequence and the ordering training label to train the ML model to perform an order recognition task of determining information about the order of sequenced frame images in image sequences based on their visual content; and
using a second set of training images, each annotated with a ground truth segmentation mask, to train the ML model to perform an image segmentation task of predicting a segmentation mask for a received image.

17. The executable program instructions of claim 16, configured to train the ML model to perform the order recognition task in a pre-training phase, and subsequently train the ML model to perform the image segmentation task in a fine-tuning phase.

18. The executable program instructions of claim 16, wherein the ML model is trained based on a multi-task loss function having:
a first term which trains the ML model to perform the order recognition task, and
a second term that trains the ML model to perform the image segmentation task;
wherein the ML model learns the order recognition task and the image segmentation task simultaneously.

19. The executable program instructions of claim 16, wherein the second set of training images comprises frame images of the set of training images sequences, those frame images used to learn both the order recognition task and the image segmentation task.

20. An image processing system comprising execution hardware configured to implement a training method comprising:
receiving a training set comprising at least one selected from the group consisting of:
training image sequences, each of which is associated with an ordering training label denoting an order of images of the training image sequence relative to an order in which the images were captured, and
training images, each of which is associated with a geographic training label denoting a geographic region in which the training image was captured; and
training an ML model based on a multi-task loss function having:
a first term which trains the ML model to perform a desired image processing task, and
at least one selected from the group consisting of:
a second term that trains the ML model to perform an order recognition task of determining information about the order of an image sequence based on its visual content, and
a third term that trains the ML model to perform a geographic classification task of distinguishing between images captured in different geographic regions based on their visual content,
the desired image processing task being an image processing task other than the order recognition task and the geographic classification task, wherein the ML model learns the desired image processing task simultaneously with the order recognition task and/or the geographic classification task.

* * * * *